(12) United States Patent
Ling et al.

(10) Patent No.: US 11,467,420 B2
(45) Date of Patent: Oct. 11, 2022

(54) CASCADED ARRANGEMENT OF TWO-MODE BRAGG GRATINGS IN MULTIPLEXING APPLICATIONS

(71) Applicant: Cisco Technology, Inc., San Jose, CA (US)

(72) Inventors: Tao Ling, Breinigsville, PA (US); Yi Ho Lee, Breinigsville, PA (US); Ravi S. Tummidi, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/301,968

(22) Filed: Apr. 20, 2021

(65) Prior Publication Data
US 2021/0286190 A1  Sep. 16, 2021

Related U.S. Application Data

(63) Continuation of application No. 16/814,721, filed on Mar. 10, 2020, now Pat. No. 11,002,980.

(51) Int. Cl.
*G02B 27/42* (2006.01)
*H04J 14/02* (2006.01)
(Continued)

(52) U.S. Cl.
CPC ....... *G02B 27/4272* (2013.01); *G02B 5/1861* (2013.01); *G02B 27/1086* (2013.01);
(Continued)

(58) Field of Classification Search
CPC ............ G02B 27/4272; G02B 27/1086; G02B 27/4244; G02B 5/1861; H04B 10/40; H04J 14/0209
(Continued)

(56) References Cited

U.S. PATENT DOCUMENTS 5,608,825 A * 3/1997 Ip .................. H04J 14/0213
                                              385/27
5,657,406 A * 8/1997 Ball .................. G02B 6/2932
                                              385/27
(Continued)

FOREIGN PATENT DOCUMENTS

| CN | 105700071 A | 6/2016 |
| CN | 109870767 A | 6/2019 |
| CN | 111736266 A | 10/2020 |

OTHER PUBLICATIONS

Castro, Jose M., et al. "Optical add-drop multiplexers based on the antisymmetric waveguide Bragg grating." Applied Optics 45.6 (2006): 1236-1243.

(Continued)

*Primary Examiner* — Dalzid E Singh
(74) *Attorney, Agent, or Firm* — Patterson + Sheridan, LLP

(57) ABSTRACT

Aspects described herein include an optical apparatus comprising an input port configured to receive an optical signal comprising a plurality of wavelengths, and a plurality of output ports. Each output port is configured to output a respective wavelength of the plurality of wavelengths. The optical apparatus further comprises a first plurality of two-mode Bragg gratings in a cascaded arrangement. Each grating of the first plurality of two-mode Bragg gratings is configured to reflect a respective wavelength of the plurality of wavelengths toward a respective output port of the plurality of output ports, and transmit any remaining wavelengths of the plurality of wavelengths.

16 Claims, 10 Drawing Sheets

(51) Int. Cl.
  *G02B 27/10* (2006.01)
  *G02B 5/18* (2006.01)
  *H04B 10/40* (2013.01)
(52) U.S. Cl.
  CPC ......... *G02B 27/4244* (2013.01); *H04B 10/40* (2013.01); *H04J 14/0209* (2013.01)
(58) Field of Classification Search
  USPC .......................................................... 398/79
  See application file for complete search history.

(56) References Cited

U.S. PATENT DOCUMENTS

| | | | | |
|---|---|---|---|---|
| 5,748,350 | A * | 5/1998 | Pan | G02B 6/2932 398/87 |
| 5,757,487 | A | 5/1998 | Kersey | |
| 5,940,556 | A * | 8/1999 | Moslehi | G02B 6/29355 385/27 |
| 6,201,907 | B1 | 3/2001 | Farries | |
| 6,263,126 | B1 | 7/2001 | Cao | |
| 6,404,948 | B2 * | 6/2002 | Alexander | G02B 6/12019 398/43 |
| 6,516,112 | B1 * | 2/2003 | Jang | G02B 6/29317 385/24 |
| 6,559,988 | B1 * | 5/2003 | Nielsen | H04J 14/0201 385/24 |
| 6,594,410 | B2 * | 7/2003 | Kersey | H04J 14/0216 385/24 |
| 7,133,582 | B1 * | 11/2006 | Moslehi | G02F 1/0128 385/13 |
| 8,532,446 | B2 | 9/2013 | Zheng et al. | |
| 9,553,689 | B2 | 1/2017 | Kato | |
| 9,829,640 | B2 | 11/2017 | Kato | |
| 9,967,049 | B2 | 5/2018 | Zheng et al. | |
| 10,317,621 | B2 | 6/2019 | Mahgerefteh | |
| 2003/0108283 | A1 * | 6/2003 | Ota | G02B 6/2932 385/24 |
| 2004/0028332 | A1 | 2/2004 | Nishiki | |
| 2004/0037503 | A1 | 2/2004 | Hastings et al. | |
| 2004/0109235 | A1 | 6/2004 | Zhong et al. | |
| 2004/0234262 | A1 | 11/2004 | Bortz | |
| 2004/0264963 | A1 * | 12/2004 | Kani | H04Q 11/0067 398/72 |
| 2005/0220406 | A1 | 10/2005 | Jones et al. | |
| 2006/0140541 | A1 | 6/2006 | Gorni et al. | |
| 2012/0315044 | A1 * | 12/2012 | McGreer | H04J 14/02 385/24 |
| 2017/0082801 | A1 | 3/2017 | Welch et al. | |
| 2020/0233378 | A1 | 7/2020 | Atlan et al. | |

OTHER PUBLICATIONS

Khurgin, Jacob B., et al. "Add-drop filters based on mode-conversion cavities." Optics letters 32.10 (2007): 1253-1255.
Horst, Folkert & Green, William & Assefa, Solomon & Shank, Steven & Vlasov, Yurii & Offrein, B.J.. (2013). Cascaded Mach-Zehnder wavelength filters in silicon photonics for low loss and flat pass-band WDM (de-) multiplexing. Optics express. 21. 11652-8. 10.1364/OE.21.011652. [Abstract Only].
Shi, Wei & Yun, Han & Lin, Charlie & Wang, Xu & Flueckiger, Jonas & Jaeger, Nicolas & Chrostowski, Lukas. (2013). Silicon CWDM Demultiplexers Using Contra-Directional Couplers. 2013 Conference on Lasers and Electro-Optics, CLEO 2013. 10.1364/CLEO_SI.2013.CTu3F.5. [Abstract Only].
Huiye Qiu, Jianfei Jiang, Ping Yu, Tingge Dai, Jianyi Yang, Hui Yu, and Xiaoqing Jiang, "Silicon band-rejection and band-pass filter based on asymmetric Bragg sidewall gratings in a multimode waveguide," Opt. Lett. 41, 2450-2453 (2016) [Abstract Only].
Madsen, C.K, et al. "Planar waveguide add/drop filter employing a mode-converting grating in an adiabatic coupler." Integrated Photonics Research .. Optical Society of America, 1998. [Abstract Only].
Puckett, "Multichannel Bragg gratings in silicon waveguides with asymmetric sidewall modulation," 2015, OSA, vol. 40, No. 3, Optical Letters, pp. 379-382 (Year: 2015).
Pan, "Dense WDM multiplexer and demultiplexer with 0.4nm channel spacing", 1998, Electronic Letters, vol. 34, No. 1, pp. 74-75 (Year: 1998).
Wang, "multi-period bragg gratings in silicon waveguides", 2013, IEEE, WD2.5, 978-1-4577-1507-5/13, pp. 442-443 (Year: 2013).
Painchaud, "Bragg grating notch filters in silicon-on-insulator waveguides", 2012, OSA, Advanced Photonics Congress (Year: 2012).
PCT Notification of Transmittal of the International Search Report and the Written Opinion of the International Searching Authority, or the Declaration for Application No. PCT/US2021/070258 dated Jun. 25, 2021.

* cited by examiner

CASCADED ARRANGEMENT OF TWO-MODE BRAGG GRATINGS IN MULTIPLEXING APPLICATIONS

CROSS-REFERENCE TO RELATED APPLICATIONS

This application is a continuation of co-pending U.S. patent application Ser. No. 16/814,721, filed Mar. 10, 2020. The aforementioned related patent application is herein incorporated by reference in its entirety.

TECHNICAL FIELD

Embodiments presented in this disclosure generally relate to optical multiplexing, and more specifically, to wavelength division multiplexing (WDM) using a cascaded arrangement of two-mode Bragg gratings

BACKGROUND

WDM schemes support multiple channels through a light-carrying medium, such as an optical waveguide or an optical fiber. WDM schemes are typically distinguished by the spacing between wavelengths. For example, a "normal" WDM system supports 2 channels spaced apart by 240 nanometers (nm), a coarse WDM (CWDM) system supports up to eighteen (18) channels that are spaced apart by 20 nm, and a dense WDM (DWDM) system supports up to eighty (80) channels that are spaced apart by 0.4 nm. Due to the wavelength spacing, a CWDM system tends to be more tolerant than a DWDM system and does not require high-precision controlled laser sources. As a result, a CWDM system tends to be less expensive and consumes less power.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
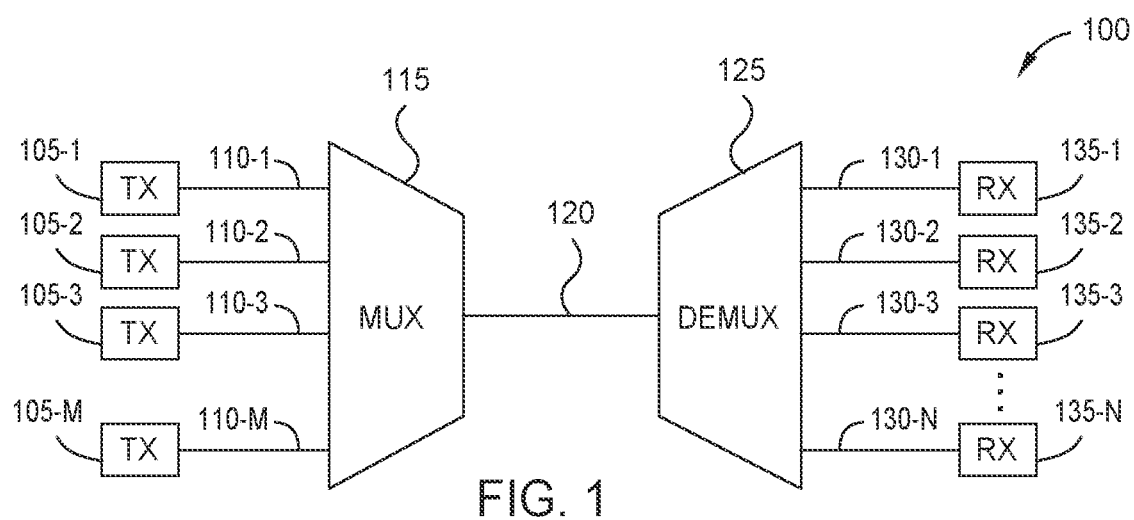
FIG. 1 is a diagram of an exemplary optical apparatus, according to one or more embodiments.

In one embodiment, an optical apparatus comprising an input port configured to receive an optical signal comprising a plurality of wavelengths, and a plurality of output ports. Each output port is configured to output a respective wavelength of the plurality of wavelengths. The optical apparatus further comprises a first plurality of two-mode Bragg gratings in a cascaded arrangement. Each grating of the first plurality of two-mode Bragg gratings is configured to reflect a respective wavelength of the plurality of wavelengths toward a respective output port of the plurality of output ports, and transmit any remaining wavelengths of the plurality of wavelengths.

In another embodiment, an optical apparatus comprises a plurality of receivers and a demultiplexer comprising an input port configured to receive an optical signal comprising a plurality of wavelengths, and a plurality of output ports. Each output port is configured to output a respective wavelength of the plurality of wavelengths to a respective receiver of the plurality of receivers. The demultiplexer further comprises a first plurality of two-mode Bragg gratings in a cascaded arrangement. Each grating of the first plurality of two-mode Bragg gratings is configured to reflect a respective wavelength of the plurality of wavelengths toward a respective output port of the plurality of output ports, and transmit any remaining wavelengths of the plurality of wavelengths.

EXAMPLE EMBODIMENTS

To achieve a WDM-based optical transceiver module with a small size, optical multiplexing and demultiplexing (mux/demux) functionality may be implemented in (or integrated with) a photonic integrated circuit (IC) of the optical transceiver module. Low optical losses with the optical mux/demux are preferable to support a lower-power optical communication system. Further, optical mux/demux having flat-top passbands are beneficial to eliminate the temperature control of the laser and will reduce the total power consumption of the optical communication system.

According to embodiments described herein, an optical apparatus comprises an input port configured to receive an optical signal comprising a plurality of wavelengths, and a plurality of output ports, wherein each output port is configured to output a respective wavelength of the plurality of wavelengths. The optical apparatus further comprises a plurality of two-mode Bragg gratings in a cascaded arrangement. Each grating is configured to reflect a respective wavelength of the plurality of wavelengths toward a respective output port, and transmit any remaining wavelengths of the plurality of wavelengths. In some embodiments, the two-mode Bragg gratings are formed in optical waveguides of a silicon photonic chip. The two-mode Bragg gratings may have sidewall corrugation shapes, such as a rectangle shape, a sine shape, or a cosine shape.

Beneficially, using the cascaded arrangement of two-mode Bragg gratings provides the multiplexer and/or the demultiplexer with a relatively flat-top passband, and silicon nitride or silicon oxynitride-based two-mode Bragg gratings can be used to eliminate the temperature control on the laser source and/or to reduce the power consumption of the optical apparatus. Further, the two-mode Bragg gratings may be capable of achieving very low insertion loss, such that the multiplexer and/or the demultiplexer has a low insertion loss, e.g., less than 1-2 decibels (dB). Further, the two-mode Bragg gratings may have much wider passbands and greater fabrication tolerances.

FIG. 1 is a diagram 100 of an exemplary optical apparatus, according to one or more embodiments. In some embodiments, the optical apparatus represents an optical transceiver module integrated into a silicon photonic chip. Other implementations of the optical apparatus are also contemplated.

The optical apparatus comprises a plurality of transmitters 105-1, 105-2, 105-3, . . . , 105-M (generically, a transmitter 105) that provide optical signals via a respective plurality of optical links 110-1, 110-2, 110-3, . . . , 110-M (generically, an optical link 110) to a multiplexer 115. In some embodiments, each transmitter 105 comprises a laser source generating a respective optical signal (e.g., an unmodulated continuous wave (CW) optical signal) having a respective wavelength. The wavelengths of the optical signals may be selected according to a predefined multiplexing scheme, such as WDM, DWDM, or CWDM. Each transmitter 105 may further comprise an optical modulator configured to modulate the respective optical signal, and may further comprise circuitry for further processing of the respective optical signal. In some embodiments, the optical links 110 are optical waveguides formed in a silicon photonic chip. In other embodiments, the optical links 110 are optical fibers.

The multiplexer 115 combines the several optical signals into a multiplexed optical signal that is output onto an optical link 120. In some embodiments, the multiplexer 115 comprises a CWDM multiplexer, although implementations using other WDM schemes are also contemplated. In some embodiments, the optical link 120 is an optical waveguide formed in the silicon photonic chip. In other embodiments, the optical link 120 is an optical fiber.

A demultiplexer 125 is communicatively coupled with the multiplexer 115 via the optical link 120. The demultiplexer 125 demultiplexes the multiplexed optical signal transmitted by the optical link 120 into a plurality of optical signals. In some embodiments, the demultiplexer 125 comprises a CWDM demultiplexer, although other implementations are also contemplated. The plurality of optical signals is provided from the demultiplexer 125 via a respective plurality of optical links 130-1, 130-2, 130-3, . . . , 130-N (generically, an optical link 130) to a plurality of receivers 135-1, 135-2, 135-3, . . . , 135-N (generically, a receiver 135). In some embodiments, the optical links 130 are optical waveguides formed in the silicon photonic chip. In other embodiments, the optical links 130 are optical fibers. In some embodiments, each receiver 135 comprises an optical demodulator to demodulate the respective optical signal, and may further comprise circuitry for further processing of the respective optical signal.

In some embodiments, and as will be discussed in greater detail, the multiplexer 115 and/or the demultiplexer 125 comprises two-mode Bragg gratings in a cascaded arrangement. Beneficially, using the cascaded arrangement of two-mode Bragg gratings provides the multiplexer 115 and/or the demultiplexer 125 with a relatively flat-top passband, and may be used to eliminate the temperature control on the laser source of the transmitters 105 and/or to reduce the power consumption of the optical apparatus. Further, the two-mode Bragg gratings may be capable of achieving very low insertion loss, such that the multiplexer 115 and/or the demultiplexer 125 has an insertion loss of less than 1-2 dB.

Figure 2:
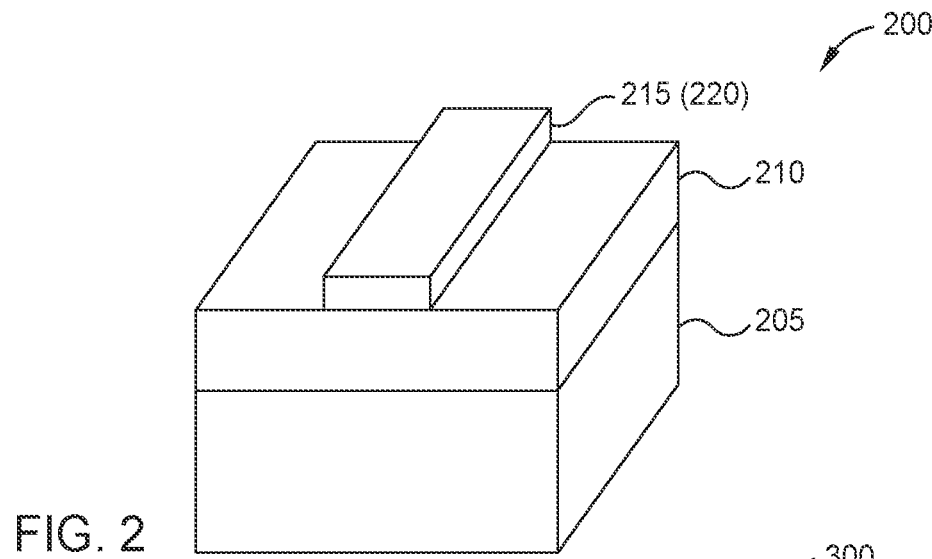
FIGS. 2 and 3 are diagrams of exemplary silicon-on-insulator (SOI) based optical waveguides, according to one or more embodiments.
Figure 3:
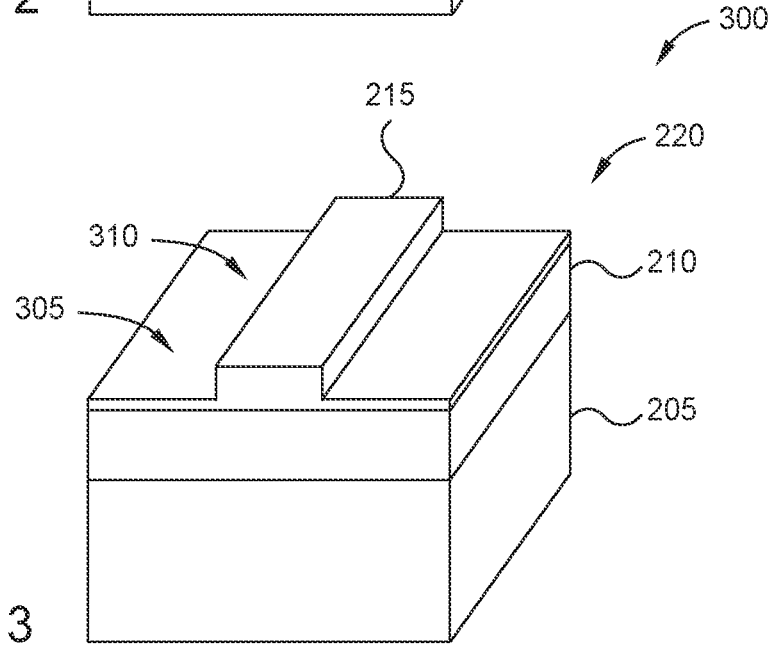

FIGS. 2 and 3 are diagrams 200, 300 of exemplary silicon-on-insulator (SOI) based optical waveguides, according to one or more embodiments. The features of the diagrams 200, 300 may be used in conjunction with other embodiments. For example, the multiplexer 115 and/or demultiplexer 125 of FIG. 1 may be implemented in a silicon photonic chip using the SOI structures illustrated in the diagrams 200, 300.

In some embodiments, a silicon substrate 205 comprises a bulk silicon (Si) substrate in which one or more features or materials for active optical device(s) to be produced (e.g., a laser, detector, modulator, absorber) are pre-processed. The thickness of the silicon substrate 205 may vary depending on the specific application. For example, the silicon substrate 205 may be the thickness of a typical semiconductor wafer (e.g., 100-700 microns), or may be thinned and mounted on another substrate.

The diagrams 200, 300 each depict the silicon substrate 205, an insulator layer 210 disposed above the silicon substrate 205, and an optical waveguide 215 formed in a waveguide layer 220 disposed above the insulator layer 210. In some embodiments, the insulator layer 210 comprises a buried oxide (BOX) layer formed of silicon dioxide. The thickness of the insulator layer 210 may vary depending on the desired application. In some embodiments, the thickness of the insulator layer 210 may range from less than one micron to tens of microns. In some embodiments, the waveguide layer 220 is formed of elemental Si (e.g., monocrystalline or polycrystalline Si). In other embodiments, the waveguide layer 220 may be formed of other suitable semiconductor materials, such as silicon nitride or silicon oxynitride deposited on the insulator layer 210. The thickness of the waveguide layer 220 may range from less than 100 nm to greater than a micron. More specifically, the waveguide layer 220 may be between 100-300 nm thick.

In the diagram 300, the optical waveguide 215 is formed as a ridge waveguide comprising a ridge 310 projecting from a base 305. The ridge waveguide generally confines a propagating optical signal within a portion of the waveguide layer 220. In some embodiments, the waveguide layer 220 has a thickness between 3-5 microns. In some embodiments, the width of the ridge 310 (as shown, in the left-right direction) is between 3-5 microns. With such dimensioning, the diameter of the optical mode may be 4-5 microns.

Figure 4:
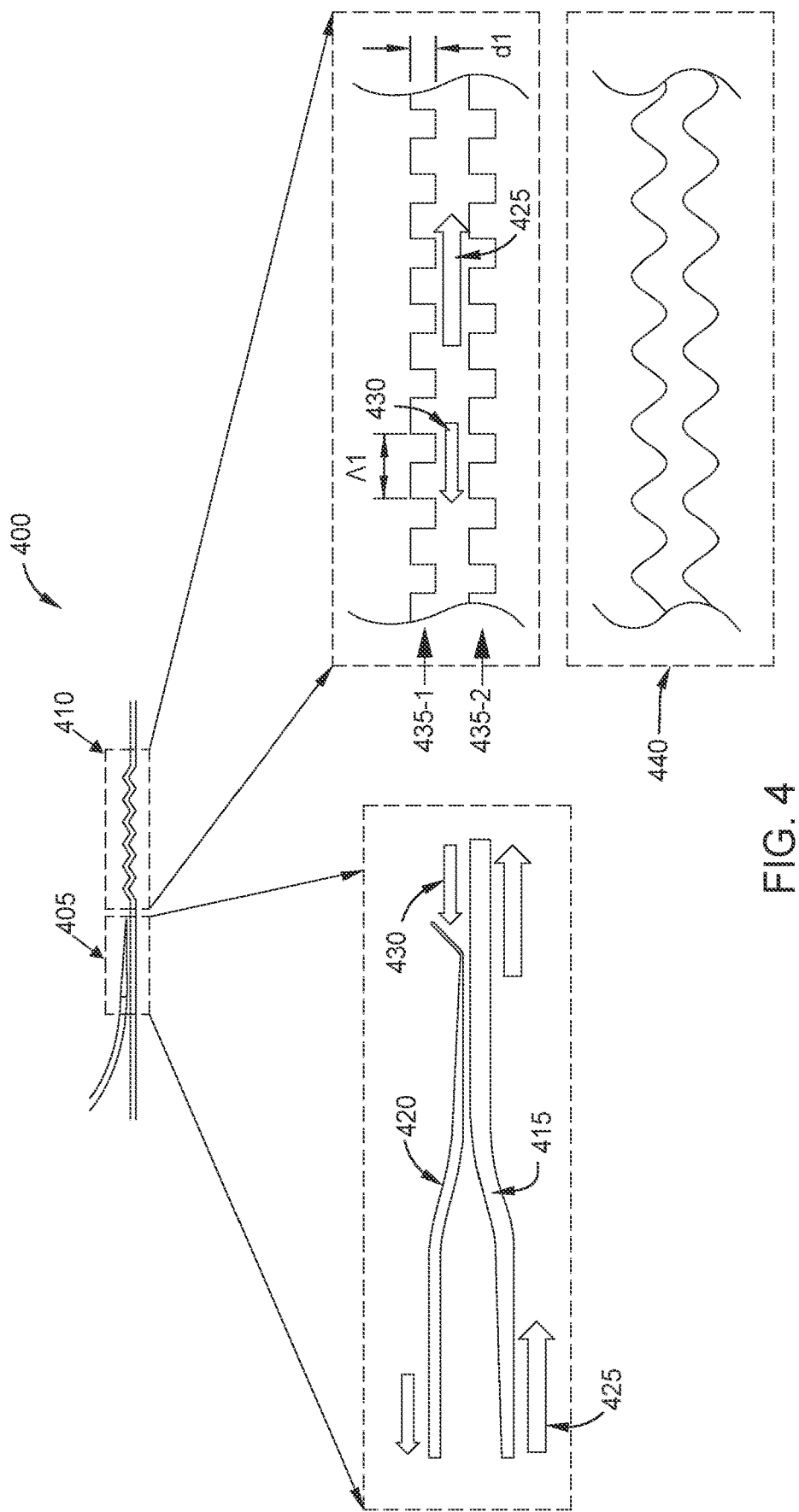
FIG. 4 is a diagram illustrating exemplary implementations of two-mode Bragg gratings with different sidewall corrugation shapes, according to one or more embodiments.

As mentioned above, grating patterns may be etched along the sidewalls of the optical waveguide 215 to form the two-mode Bragg gratings of the multiplexer 115 and/or demultiplexer 125. FIG. 4 is a diagram 400 illustrating exemplary implementations of a two-mode Bragg grating with different sidewall corrugation shapes, according to one or more embodiments. The features of the diagram 400 may be used in conjunction with other embodiments. For example, the sidewall gratings may be used by the two-mode Bragg grating to transmit one wavelength and reflect another wavelength of light propagating through the optical waveguide 215.

The diagram 400 depicts a mode multiplexer 405 and a two-mode Bragg grating 410. A first arm 415 of the mode multiplexer 405 propagates a fundamental mode 425 (e.g., a fundamental transverse electric (TE) mode), which is propagated to the two-mode Bragg grating 410. The two-mode Bragg grating 410 comprises sidewalls 435-1, 435-2 that have a grating pattern with a corrugation period $\Lambda_1$ and a depth $d_1$. Although the corrugation shapes of the sidewalls 435-1, 435-2 are shown as being a rectangle shape, alternate shapes such as a sine shape (as in grating pattern 440), a cosine shape, etc. are also contemplated.

The grating pattern may be formed, e.g., by deep etching into an edge of an optical waveguide to create the periodic grating pattern along the length of the optical waveguide. As shown, the two-mode Bragg grating 410 transmits a first mode (e.g., the fundamental mode 425) and reflects a second mode (e.g., a second-order mode 430) to the mode multiplexer 405. A second arm 420 of the mode multiplexer 405 propagates the second-order mode. Other implementations of mode multiplexers 405 are also contemplated, such as asymmetric Y-junction mode multiplexers.

In some embodiments, the grating patterns are formed with a silicon nitride or silicon oxynitride material. For example, the silicon nitride or silicon oxynitride material may be deposited above a silicon oxide layer and the optical waveguide is formed using a dry etching process. Both silicon nitride and silicon oxynitride have thermo-optic coefficients smaller than that of elemental silicon, which results in the two-mode Bragg gratings (and the associated optical apparatus) being less sensitive to temperature variations during operation. In some cases, the lower temperature sensitivity means that no thermal tuning of the optical apparatus is required during operation.

The grating patterns may have any suitable alternate implementation. For example, one or more grating patterns may be formed using a buried grating layer. Further, in cases where the length of a two-mode Bragg grating is sufficiently long (e.g., implemented within an optical fiber), the sidewall gratings may be spaced apart from each other (e.g., at different positions along the length of the first Bragg grating).

Figure 5:
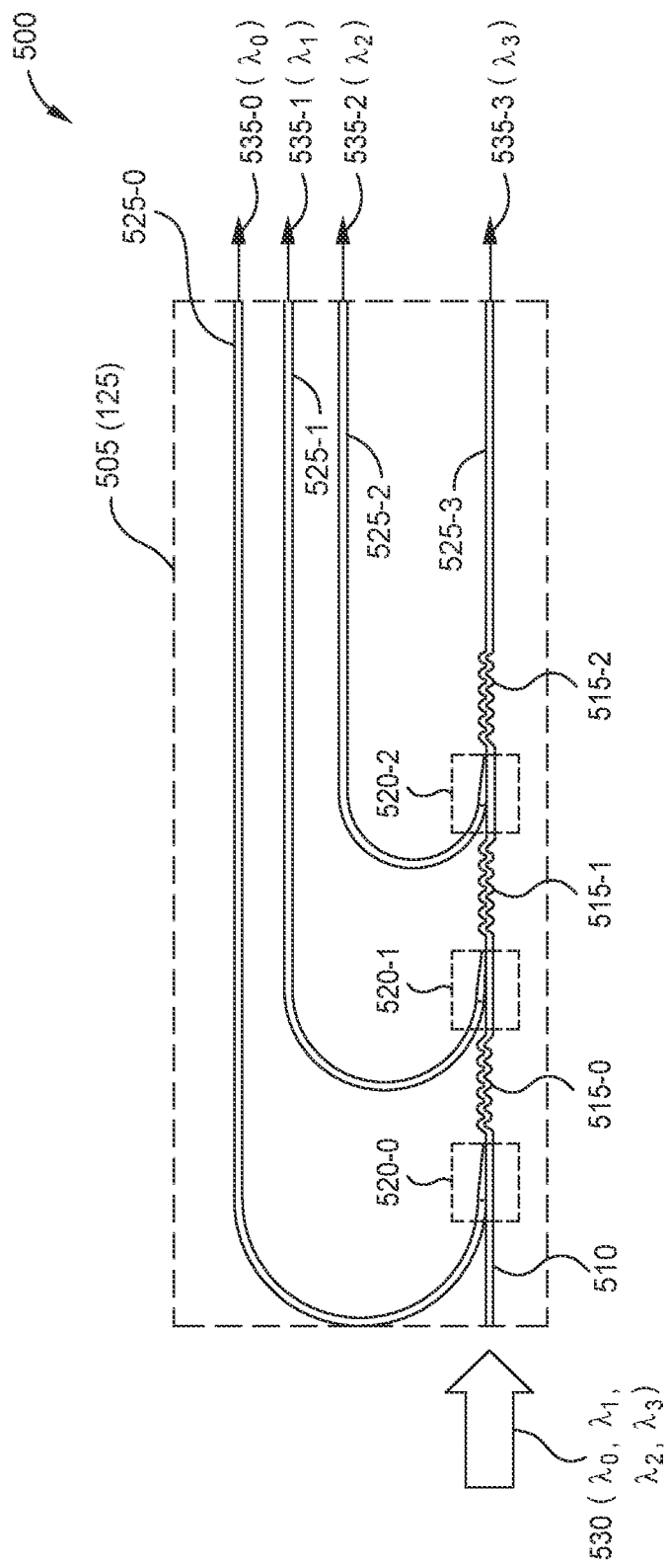
FIGS. 5 and 6 are diagrams of exemplary implementations of a demultiplexer with a cascaded arrangement of two-mode Bragg gratings, according to one or more embodiments.
Figure 6:
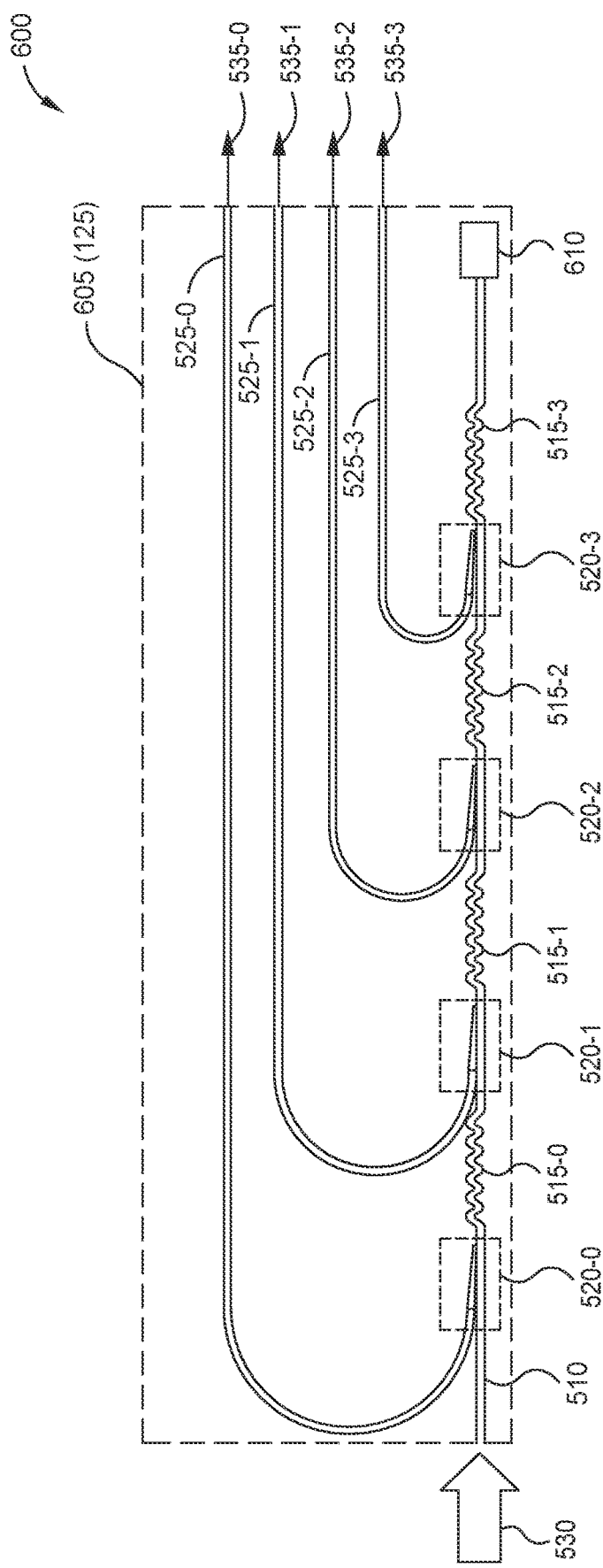

FIGS. 5 and 6 are diagrams 500, 600 of exemplary implementations of a demultiplexer 505, 605 with a cascaded arrangement of two-mode Bragg gratings, according to one or more embodiments. The features illustrated in the diagrams 500, 600 may be used in conjunction with other embodiments. For example, mode multiplexers and two-mode Bragg gratings included in the demultiplexers 505, 605 may be configured as shown in FIG. 4.

In the diagram 500, the demultiplexer 505 comprises an input port 510 and a plurality of two-mode Bragg gratings 515-0, 515-1, 515-2 (which are also referred to herein as "gratings" or "Bragg gratings") in a cascaded arrangement (which may alternately be referred to as a "serial" arrangement). Each grating 515-0, 515-1, 515-2 reflects a respective wavelength, and transmits any remaining wavelengths. For example, the grating 515-0 reflects a first wavelength via a drop port, and transmits at least one wavelength via an output port to gratings 515-1, 515-2 that are downstream of the grating 515-0.

The gratings 515-0, 515-1, 515-2 may have any suitable filter responses for separating the respective wavelength for reflecting. In some embodiments, the gratings 510-0, 515-1, 515-2 are bandpass filters, which may have non-overlapping or partially overlapping passbands. For examples, the gratings 515-0, 515-1, 515-2 may have partially overlapping passbands with a center wavelength and an upper roll-off wavelength selected such that a range of the respective wavelength reflected by the grating 510-0, 515-1, 515-2 is entirely included between the center wavelength and the upper roll-off wavelength. In other embodiments, the gratings 515-0, 515-1, 515-2 are low-pass filters and may have successively greater roll-off wavelengths.

In some embodiments, the demultiplexer 505 further comprises a plurality of mode multiplexers 520-0, 520-1, 520-2. Each mode multiplexer of the plurality of mode multiplexers 520-0, 520-1, 520-2 receives the wavelength reflected by a respective grating 515-0, 515-1, 515-2. Each mode multiplexer converts the mode of the reflected wavelength (e.g., a first-order TE mode) into a fundamental TE mode. The plurality of mode multiplexers 520-0, 520-1, 520-2 may have any suitable implementation, e.g., using on-resonance and off-resonance switching rings. Each mode multiplexer 520-0, 520-1, 520-2 has an output that is coupled with a respective output port 525-0, 525-1, 525-2 of a plurality of output ports 525-0, 525-1, 525-2, 525-3 of the demultiplexer 505. In other embodiments, the plurality of mode multiplexers 520-0, 520-1, 520-2 may be omitted, such that the gratings 515-0, 515-1, 515-2 provide the reflected wavelengths (e.g., as a first order or higher mode) directly to the output ports 525-0, 525-1, 525-2.

Thus, responsive to receiving an optical signal 530 comprising a plurality of wavelengths $\lambda_0, \lambda_1, \lambda_2, \lambda_3$ at the input port 510, the grating 515-0 reflects the wavelength $\lambda_0$ and transmits the remaining wavelengths $\lambda_1, \lambda_2, \lambda_3$. The mode multiplexer 520-0 receives the wavelength $\lambda_0$ and provides the wavelength $\lambda_0$ (with the mode converted to a fundamental mode) to the output port 525-0 as an optical signal 535-0. The grating 515-1 receives the wavelengths $\lambda_1, \lambda_2, \lambda_3$, reflects the wavelength $\lambda_1$, and transmits the remaining wavelengths $\lambda_2, \lambda_3$. The mode multiplexer 520-1 receives the wavelength $\lambda_1$ and provides the wavelength $\lambda_1$ (with the mode converted to a fundamental mode) to the output port 525-1 as an optical signal 535-1.

The grating 515-2 receives the wavelengths $\lambda_2, \lambda_3$, reflects the wavelength $\lambda_2$, and transmits the remaining wavelength $\lambda_3$. The mode multiplexer 520-2 receives the wavelength $\lambda_2$ and provides the wavelength $\lambda_2$ (with the mode converted to a fundamental mode) to the output port 525-2 as an optical signal 535-2. The remaining wavelength $\lambda_3$ is provided from the grating 515-2 to the output port 525-3 as an optical signal 535-3.

In the demultiplexer 505, the grating 515-2 represents a "last" grating in the cascaded arrangement of the gratings 515-0, 515-1, 515-2. Here, the grating 515-2 reflects a "second-to-last" wavelength (i.e., the wavelength $\lambda_2$) of the plurality of wavelengths $\lambda_0, \lambda_1, \lambda_2, \lambda_3$ toward the output port 525-2, and transmits a "last" wavelength (i.e., the wavelength $\lambda_3$) to the output port 525-3.

In the diagram 600, the demultiplexer 605 comprises the input port 510, the plurality of output ports 525-0, 525-1, 525-2, 525-3, and a cascaded arrangement of the gratings 515-0, 515-1, 515-2 and a grating 515-3. The operation of the demultiplexer 605 is generally similar to that of the demultiplexer 505. However, the grating 515-3 receives the wavelength $\lambda_3$ from the grating 515-2, and reflects the wavelength $\lambda_3$. The demultiplexer 605 further comprises a mode multiplexer 520-3 that receives the wavelength $\lambda_3$ and provides the wavelength $\lambda_3$ (with the mode converted to a fundamental mode) to the output port 525-3 as the optical signal 535-3. In another embodiment, the mode multiplexer 520-3 may be omitted.

In some embodiments, the output of the grating 515-3 (e.g., a transmit port) is coupled with an optical absorber 610. In some embodiments, the optical absorber 610 comprises a heavily-doped silicon waveguide. Beneficially, the optical absorber 610 mitigates reflections of optical signals, which can further improve the signal-to-noise ratio (SNR) of the optical signal 535-3.

In the demultiplexer 605, the grating 515-3 represents a "last" grating in the cascaded arrangement of the gratings 515-0, 515-1, 515-2, 515-3. Here, the grating 515-3 reflects a "last" wavelength (i.e., the wavelength $\lambda_3$) of the plurality of wavelengths $\lambda_0, \lambda_1, \lambda_2, \lambda_3$ toward the output port 525-3.

Figure 7:
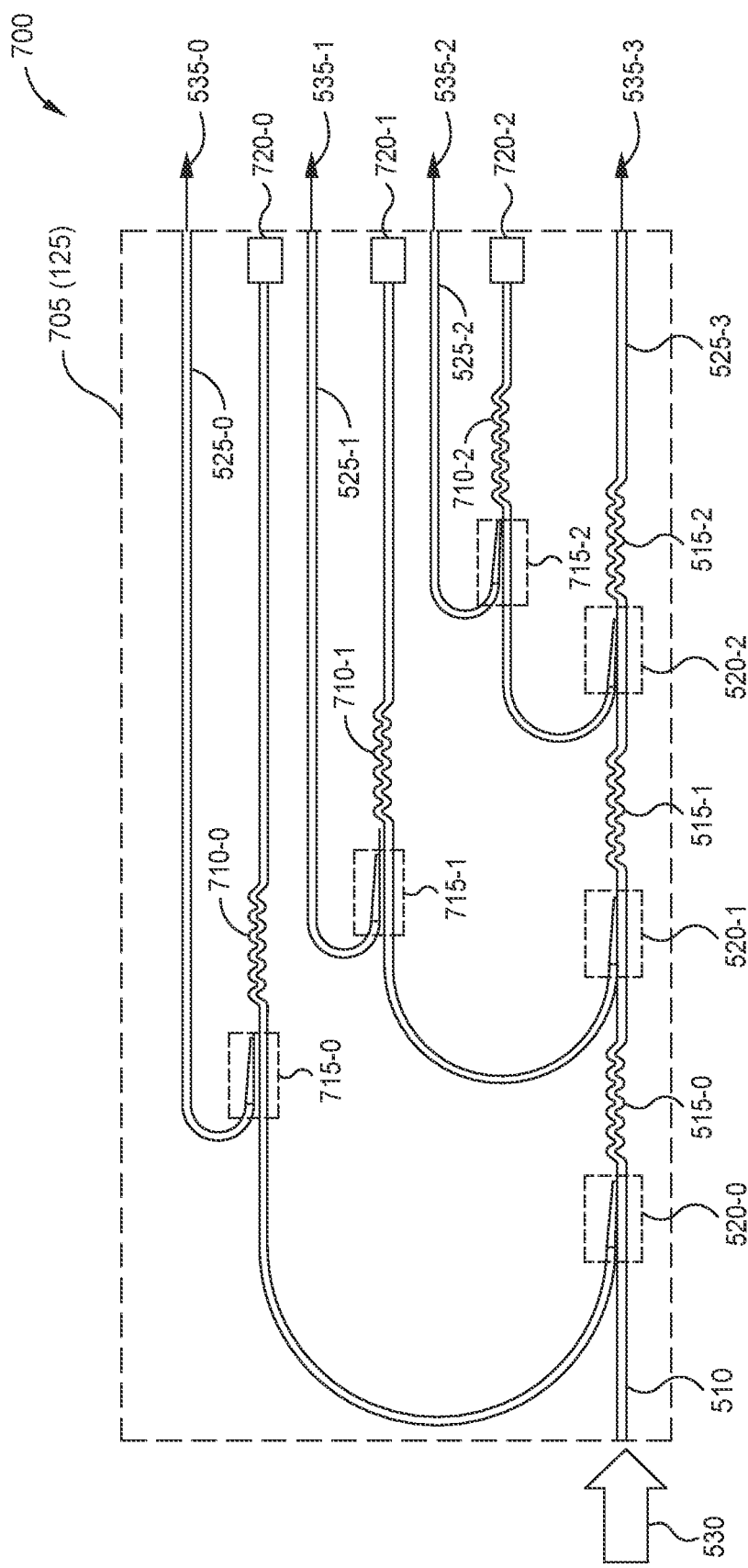
FIGS. 7 and 8 are diagrams of exemplary implementations of a demultiplexer with mitigated crosstalk, according to one or more embodiments.
Figure 8:
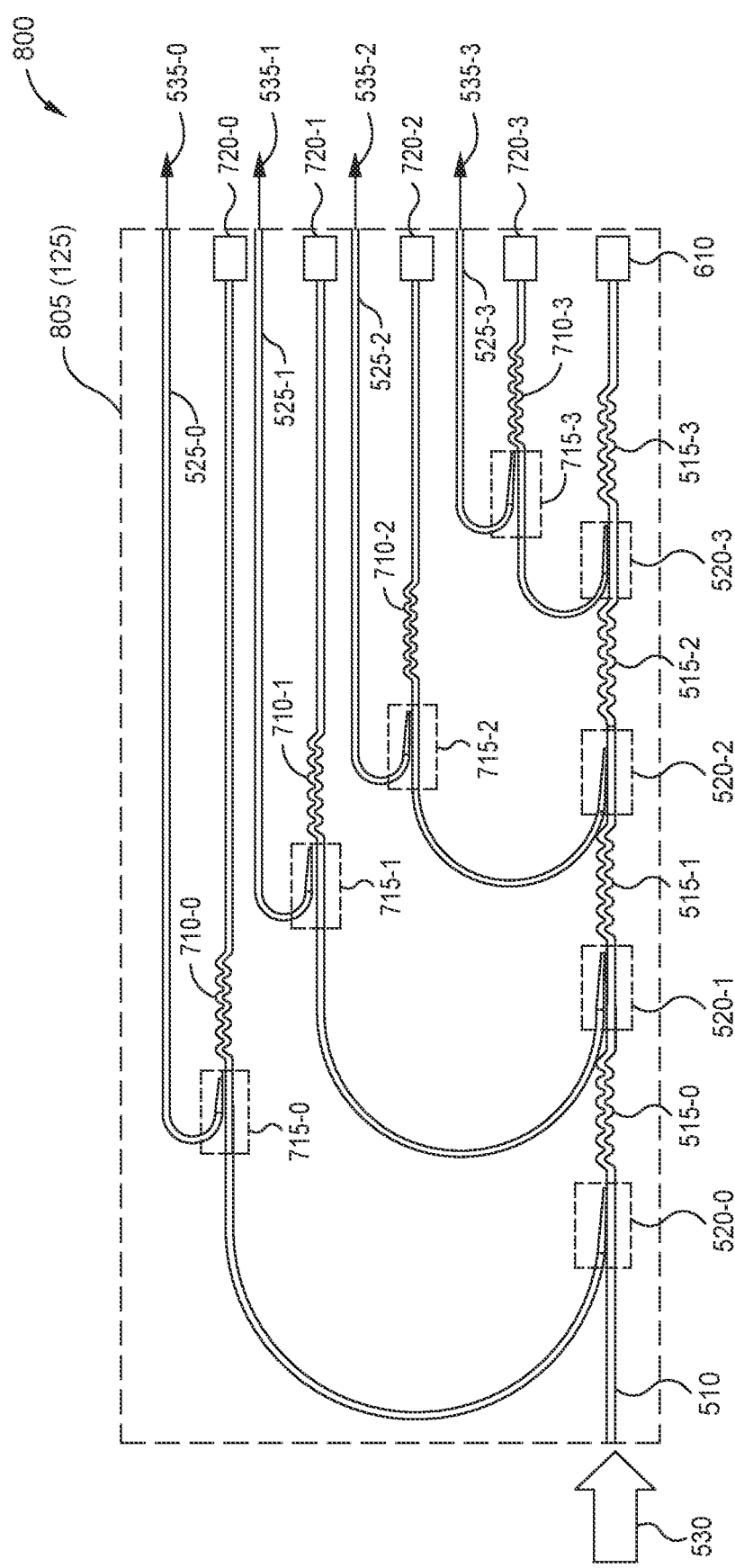

FIGS. 7 and 8 are diagrams 700, 800 of exemplary implementations of a demultiplexer 705, 805 with mitigated crosstalk, according to one or more embodiments. The features illustrated in the diagrams 700, 800 may be used in conjunction with other embodiments. For example, mode multiplexers and two-mode Bragg gratings included in the demultiplexers 705, 805 may be configured as shown in FIG. 4.

In the diagram 700, the demultiplexer 705 comprises the input port 510, the plurality of output ports 525-0, 525-1, 525-2, 525-3, a cascaded arrangement of the gratings 515-0, 515-1, 515-2, and the plurality of mode multiplexers 520-0, 520-1, 520-2. The operation of the demultiplexer 705 is generally similar to that of the demultiplexer 505, discussed above.

The demultiplexer 705 further comprises a second plurality of two-mode Bragg gratings 710-0, 710-1, 710-2. Each grating 710-0, 710-1, 710-2 receives a wavelength reflected by a respective grating 515-0, 515-1, 515-2, and reflects the wavelength toward a respective output port 525-0, 525-1, 525-2. The demultiplexer 705 further comprises a plurality of mode multiplexers 715-0, 715-1, 715-2. Each mode multiplexer of the plurality of mode multiplexers 715-0, 715-1, 715-2 receives the wavelength reflected by a respective grating 710-0, 710-1, 710-2. Each mode multiplexer 715-0, 715-1, 715-2 has an output that is coupled with a respective output port 525-0, 525-1, 525-2. The demultiplexer 705 further comprises a plurality of optical absorbers 720-0, 720-1, 720-2. Each grating 710-0, 710-1, 710-2 has an output coupled with a respective optical absorber 720-0, 720-1, 720-2, each of which may be configured similarly to the optical absorber 610.

In the diagram 800, the demultiplexer 805 comprises the input port 510, the plurality of output ports 525-0, 525-1, 525-2, 525-3, a cascaded arrangement of the gratings 515-0, 515-1, 515-2, 515-3 and the plurality of mode multiplexers 520-0, 520-1, 520-2, 520-3. The operation of the demultiplexer 805 is generally similar to that of the demultiplexer 605, discussed above.

The demultiplexer 805 further comprises a second plurality of two-mode Bragg gratings 710-0, 710-1, 710-2, 710-3. Each grating 710-0, 710-1, 710-2, 710-3 receives a wavelength reflected by a respective grating 515-0, 515-1, 515-2, 515-3 and reflects the wavelength toward a respective output port 525-0, 525-1, 525-2, 525-3. The demultiplexer 805 further comprises a plurality of mode multiplexers 715-0, 715-1, 715-2, 715-3. Each mode multiplexer of the plurality of mode multiplexers 715-0, 715-1, 715-2, 715-3 receives the wavelength reflected by a respective grating 710-0, 710-1, 710-2, 710-3. Each mode multiplexer 715-0, 715-1, 715-2, 715-3 has an output that is coupled with a respective output port 525-0, 525-1, 525-2, 525-3. The demultiplexer 705 further comprises a plurality of optical absorbers 720-0, 720-1, 720-2, 720-3. Each grating 710-0, 710-1, 710-2, 710-3 has an output coupled with a respective optical absorber 720-0, 720-1, 720-2, 720-3.

Although the combination of a mode multiplexer 405 with a two-mode Bragg grating 410, as shown in FIG. 4, is used in the implementations of the demultiplexer 505, 605, 705, 805 to perform a demultiplexing function, it will be noted that the combination of the mode multiplexer 405 with the two-mode Bragg grating 410 may be used to perform a multiplexing function. As a result, the combination of the mode multiplexer 405 with the two-mode Bragg grating 410 may be used in implementations of a multiplexer comprising a plurality of two-mode Bragg gratings in a cascaded arrangement.

Figure 9:
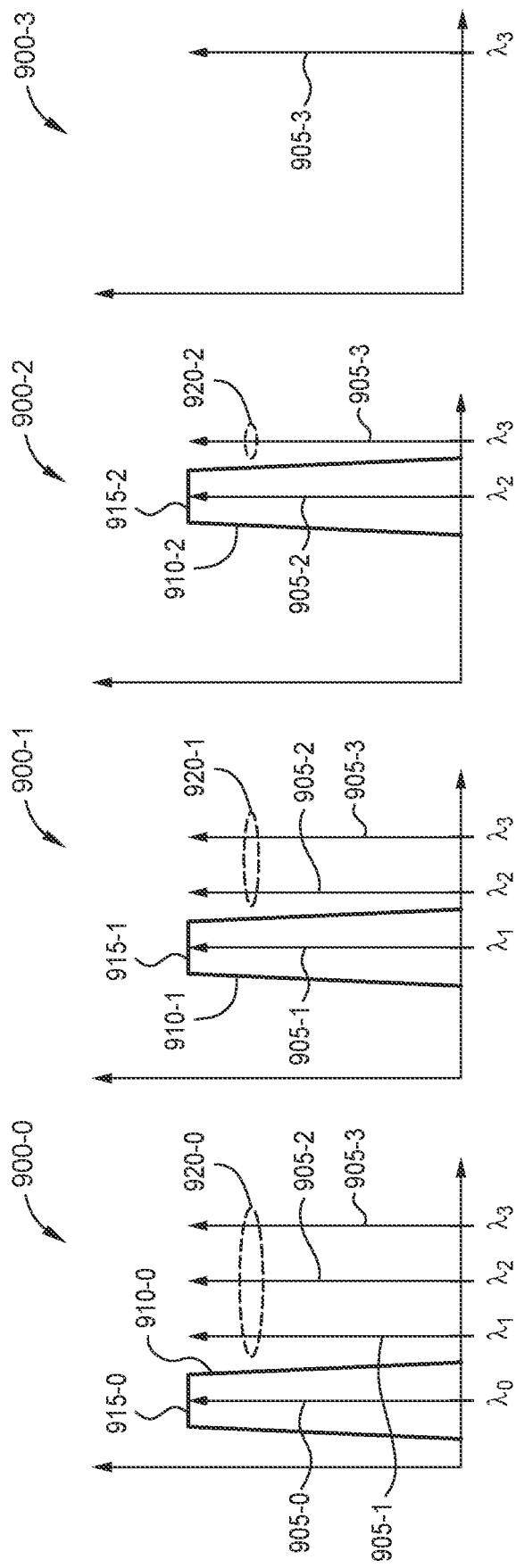
FIG. 9 are graphs illustrating operation of the two-mode Bragg gratings as bandpass filters, according to one or more embodiments.

FIG. 9 are graphs 900-0, 900-1, 900-2, 900-3 illustrating operation of the two-mode Bragg gratings as bandpass filters, according to one or more embodiments. The features illustrated in the graphs 900-0, 900-1, 900-2, 900-3 may be used in conjunction with other embodiments. For example, the cascaded arrangement in any of the demultiplexers 505, 605, 705, 805 may have gratings configured as bandpass filters. As discussed above, the gratings may have non-overlapping or partially overlapping passbands.

In the graph 900-0, the first grating in the cascaded arrangement receives an optical signal comprising a plurality of signal components 905-0, 905-1, 905-2, 905-3 at a respective plurality of wavelengths $\lambda_0, \lambda_1, \lambda_2, \lambda_3$. A filter response 910-0 of the first grating includes a first passband 915-0, such that the signal component 905-0 (at the wavelength $\lambda_0$) is reflected by the first grating. The remaining wavelengths $\lambda_1, \lambda_2, \lambda_3$ (represented as a group 920-0 of the signal components 905-1, 905-2, 905-3) are transmitted by the first grating to a second grating in the cascaded arrangement.

In the graph 900-1, the second grating receives the signal components 905-1, 905-2, 905-3 at the respective wavelengths $\lambda_1, \lambda_2, \lambda_3$. A filter response 910-1 of the second grating includes a second passband 915-1, such that the signal component 905-1 (at the wavelength $\lambda_1$) is reflected by the second grating. The remaining wavelengths $\lambda_2, \lambda_3$ (represented as a group 920-1 of the signal components 905-2, 905-3) are transmitted by the second grating to a third grating in the cascaded arrangement.

In the graph 900-2, the third grating receives the signal components 905-2, 905-3 at the respective wavelengths $\lambda_2, \lambda_3$. A filter response 910-2 of the third grating includes a third passband 915-1, such that the signal component 905-2 (at the wavelength $\lambda_2$) is reflected by the third grating. The remaining wavelength $\lambda_3$ (represented as a group 920-2 of the signal component 905-3) is transmitted by the third grating.

The signal component 905-3 (at the wavelength $\lambda_3$) is illustrated in the graph 900-3. In some embodiments, the signal component 905-3 is transmitted by the third grating to an output port. In other embodiments, the signal components 905-3 is reflected by a fourth grating toward the output port. Although the graphs 900-0, 900-1, 900-2, 900-3 show one sequence of filtering the signal components 905-0, 905-1, 905-2, 905-3 using the cascaded arrangement, other embodiments may have alternate sequences of filtering the signal components 905-0, 905-1, 905-2, 905-3.

Figure 10:
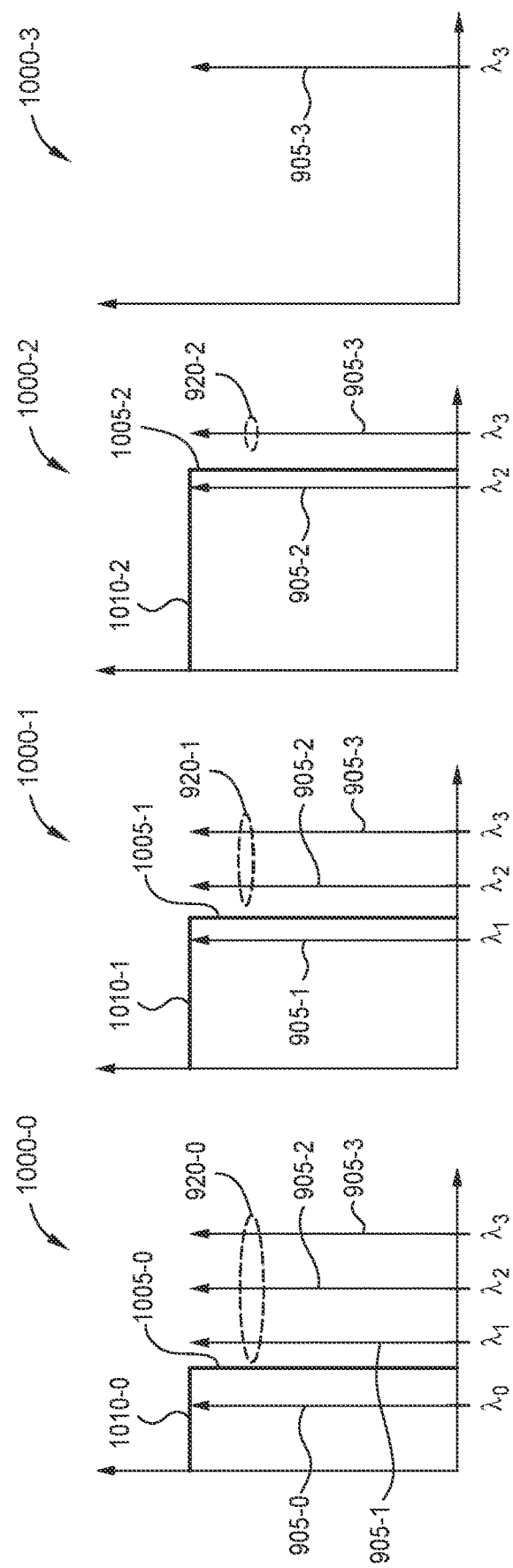
FIG. 10 are graphs illustrating operation of the two-mode Bragg gratings as low-pass filters, according to one or more embodiments.

FIG. 10 are graphs 1000-0, 1000-1, 1000-2, 1000-3 illustrating operation of the two-mode Bragg gratings as low-pass filters, according to one or more embodiments. The features illustrated in the graphs 1000-0, 1000-1, 1000-2, 1000-3 may be used in conjunction with other embodiments. For example, the cascaded arrangement in any of the demultiplexers 505, 605, 705, 805 may have gratings configured as low-pass filters.

In the graph 1000-0, the first grating in the cascaded arrangement receives the optical signal comprising the plurality of signal components 905-0, 905-1, 905-2, 905-3. A filter response 1005-0 of the first grating includes a first passband 1010-0, such that the signal component 905-0 (at the wavelength $\lambda_0$) is reflected by the first grating. The remaining wavelengths $\lambda_1, \lambda_2, \lambda_3$ are transmitted by the first grating to a second grating in the cascaded arrangement.

In the graph 1000-1, the second grating receives the signal components 905-1, 905-2, 905-3. A filter response 1005-1 of the second grating includes a second passband 1010-1, such that the signal component 905-1 (at the wavelength $\lambda_1$) is reflected by the second grating. The remaining wavelengths $\lambda_2, \lambda_3$ are transmitted by the second grating to a third grating in the cascaded arrangement.

In the graph 1000-2, the third grating receives the signal components 905-2, 905-3. A filter response 1005-2 of the third grating includes a third passband 1010-1, such that the signal component 905-2 (at the wavelength $\lambda_2$) is reflected by the third grating. The remaining wavelength $\lambda_3$ is transmitted by the third grating.

The signal component 905-3 (at the wavelength $\lambda_3$) is illustrated in the graph 1000-3. In some embodiments, the signal component 905-3 is transmitted by the third grating to an output port. In other embodiments, the signal components 905-3 is reflected by a fourth grating toward the output port.

As shown, the passbands 1010-0, 1010-1, 1010-2, 1010-3 are all partially overlapping with each other. However, other embodiments may include different combinations of passbands, which may include some passbands that are non-overlapping. For example, the cascaded arrangement may include a combination of one or more gratings configured as low-pass filters and one or more gratings configured as bandpass filters. Further, gratings configured as high-pass filters are also contemplated, whether used in isolation or in combination with other types of filters.

Figure 11:
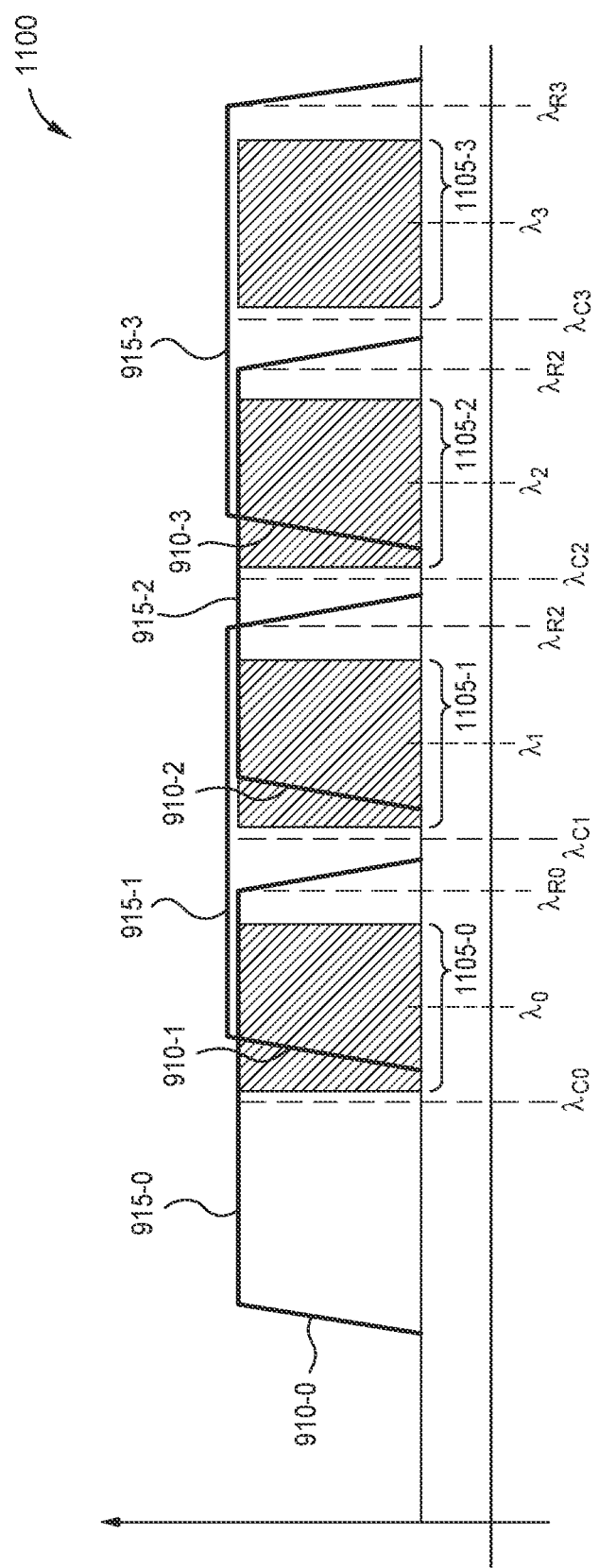
FIG. 11 is a graph illustrating operation of the two-mode Bragg gratings as bandpass filters having partially overlapping passbands, according to one or more embodiments.

FIG. 11 is a graph 1100 illustrating operation of the two-mode Bragg gratings as bandpass filters having partially overlapping passbands, according to one or more embodiments. The features illustrated in the graph 1100 may be used in conjunction with other embodiments. For example, the cascaded arrangement in any of the demultiplexers 505, 605, 705, 805 may have gratings configured as bandpass filters.

The graph 1100 illustrates the filter responses 910-0, 910-1, 910-2, 910-3 for the respective gratings. The filter responses 910-0, 910-1, 910-2, 910-3 include the partially overlapping passbands 915-0, 915-1, 915-2, 915-3. Each passband 915-0, 915-1, 915-2, 915-3 has a respective center wavelength $\lambda_{C0}, \lambda_{C1}, \lambda_{C2}, \lambda_{C3}$ and a respective upper roll-off wavelength $\lambda_{R0}, \lambda_{R1}, \lambda_{R2}, \lambda_{R3}$. The center wavelengths $\lambda_{C0}, \lambda_{C1}, \lambda_{C2}, \lambda_{C3}$ and the upper roll-off wavelengths $\lambda_{R0}, \lambda_{R1}, \lambda_{R2}, \lambda_{R3}$ are selected such that ranges 1105-0, 1105-1, 1105-2, 1105-3 surrounding the respective wavelengths $\lambda_0, \lambda_1, \lambda_2, \lambda_3$ are entirely included between the center wavelengths $\lambda_{C0}, \lambda_{C1}, \lambda_{C2}, \lambda_{C3}$ and the upper roll-off wavelengths $\lambda_{R0}, \lambda_{R1}, \lambda_{R2}, \lambda_{R3}$. Stated another way, a first grating is designed such that a range 1105-0 surrounding a first wavelength $\lambda_0$ is entirely included between the center wavelength $\lambda_{C0}$ and the upper roll-off wavelength $\lambda_{R0}$, a second grating is designed such that a range 1105-1 surrounding a second wavelength $\lambda_1$ is entirely included between the center wavelength $\lambda_{C1}$ and the upper roll-off wavelength $\lambda_{R1}$, and so forth. By accommodating the ranges 1105-0, 1105-1, 1105-2, 1105-3 in this manner, the partially overlapping passbands 915-0, 915-1, 915-2, 915-3 may be spaced closer together to have a greater amount of overlap while maintaining suitable selectivity of the gratings (i.e., to reflect one wavelength but not an adjacent wavelength) in the cascaded arrangement.

In one non-limiting example of a CWDM scheme, four (4) lanes are defined such that the wavelength $\lambda_0$=1271 nm, the wavelength $\lambda_1$=1291 nm, the wavelength $\lambda_2$=1311 nm, and the wavelength $\lambda_3$=1331 nm. Each of the ranges 1105-0, 1105-1, 1105-2, 1105-3 is ±6.5 nm of the respective wavelength $\lambda_0, \lambda_1, \lambda_2, \lambda_3$, such that the range 1105-0 is 1264.5 nm to 1277.5 nm (corresponding to a total range of 13 nm), the range 1105-1 is 1284.5 nm to 1297.5 nm, the range 1105-2 is 1304.5 nm to 1317.5 nm, and the range 1105-3 is 1324.5 nm to 1337.5 nm.

Assume that the center wavelength $\lambda_{C0}$=1264 nm, the center wavelength $\lambda_{C1}$=1284 nm, the center wavelength $\lambda_{C2}$=1304 nm, and the center wavelength $\lambda_{C3}$=1324 nm (corresponding to a channel spacing of 20 nm). As each of the gratings has a passband of 32 nm, the upper roll-off wavelength $\lambda_{R0}$=1280 nm, the upper roll-off wavelength $\lambda_{R1}$=1300 nm, the upper roll-off wavelength $\lambda_{R2}$=1320 nm, and the upper roll-off wavelength $\lambda_{R3}$=1340 nm.

In this way, the range 1105-0 (1264.5 nm to 1277.5 nm) is entirely included between the center wavelength $\lambda_{C0}$ (1264 nm) and the upper roll-off wavelength $\lambda_{R0}$ (1280 nm) for the first grating, the range 1105-1 (1284.5 nm to 1297.5 nm) is entirely included between the center wavelength $\lambda_{C1}$ (1284 nm) and the upper roll-off wavelength $\lambda_{R1}$ (1300 nm) for the second grating, and so forth.

Beneficially, by configuring the gratings to provide the passbands 915-0, 915-1, 915-2, 915-3 (FIGS. 9, 11) and the passbands 1010-0, 1010-1, 1010-2, 1010-3 (FIG. 10) as relatively wide and flat-top passbands with a steep edge spectrum response, the demultiplexer tends to have greater tolerance for fabrication variations, material layer thickness variations, and/or temperature variations. Using a silicon nitride or silicon oxynitride material for the gratings further increases the tolerance for these variations.

While the above example is discussed in terms of partially overlapping passbands 915-0, 915-1, 915-2, 915-3 for bandpass filters, similar techniques may be used to space the passbands of low-pass filters closer together while maintaining a suitable selectivity. For example, the cut-off wavelengths of the low-pass filters may be selected such that a minimum margin (e.g., 2 nm) exists between the cut-off wavelength for a grating and the range surrounding the particular wavelength of the optical signal to be reflected by the grating.

Further, while the demultiplexers 505, 605, 705, 805 have been depicted as a 1-to-4 (1:4) demultiplexer having three (3) or four (4) two-mode Bragg gratings in a cascaded arrangement, other configurations of the demultiplexers 505, 605, 705, 805 are also contemplated. For example, the demultiplexer 125 may include a larger or smaller number of Bragg gratings in the cascaded arrangement, different filter responses for the gratings, and so forth.

Figure 12:
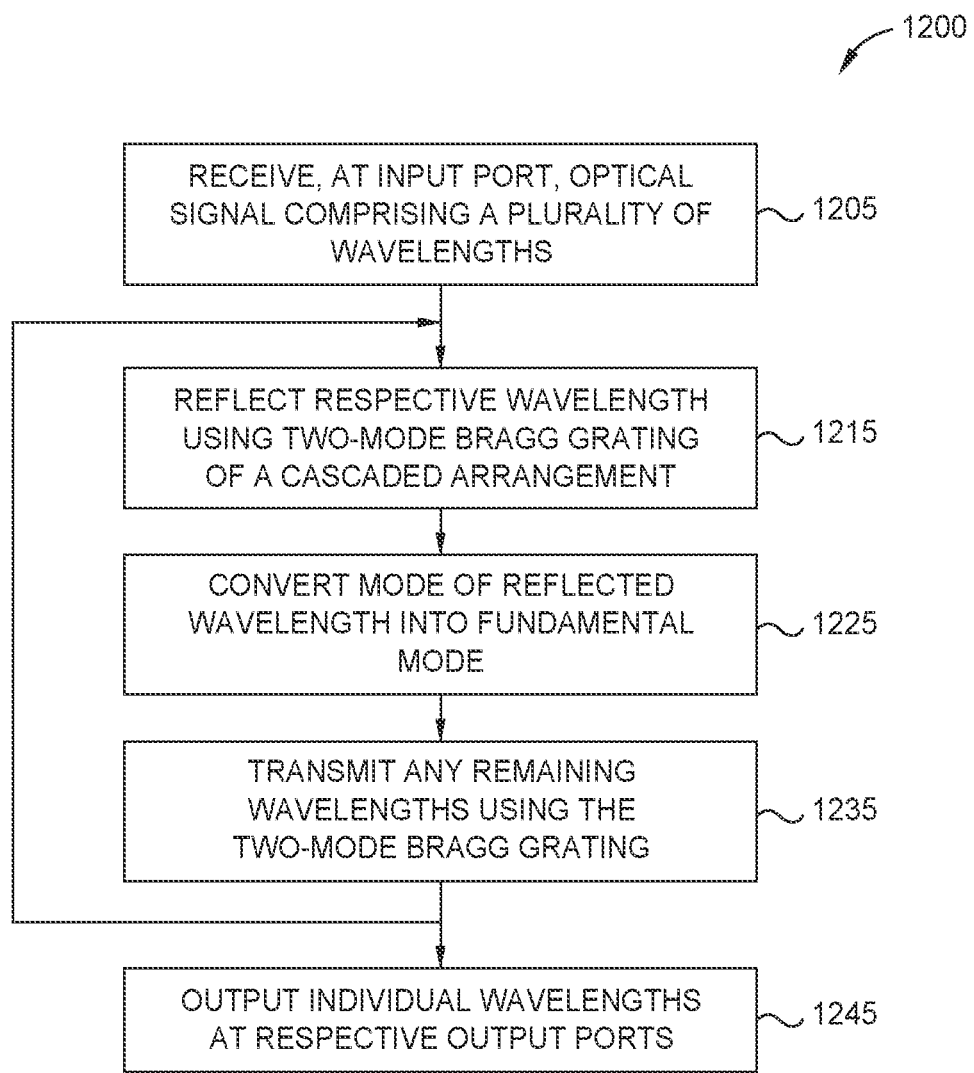
FIG. 12 illustrates a method of demultiplexing using a cascaded arrangement of two-mode Bragg gratings, according to one or more embodiments.

FIG. 12 illustrates a method 1200 of demultiplexing using a cascaded arrangement of two-mode Bragg gratings, according to one or more embodiments. The method 1200 may be used in conjunction with other embodiments, e.g., performed using any of the demultiplexers 505, 605, 705, 805 described above.

The method 1200 begins at block 1205, where the demultiplexer receives, at an input port, an optical signal comprising a plurality of wavelengths. At block 1215, a respective wavelength is reflected using a two-mode Bragg grating of a cascaded arrangement. At block 1225, the mode of the reflected wavelength is converted into a fundamental mode. In some embodiments, the conversion is performed using a mode multiplexer arranged at a drop port of the two-mode Bragg grating.

At block 1235, any remaining wavelengths are transmitted using the two-mode Bragg grating. The method 1200 returns from block 1235 to block 1215 for each of the two-mode Bragg gratings of the cascaded arrangement. In some embodiments, a last wavelength is reflected by a last grating of the cascaded arrangement. In other embodiments, a last grating reflects a second-to-last wavelength and transmits the last wavelength. At block 1245, individual wavelengths are output at respective output ports. The method 1200 ends following completion of block 1245.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical apparatus comprising:
   an input port configured to receive an optical signal comprising a plurality of wavelengths;
   a plurality of output ports each configured to output a respective wavelength of the plurality of wavelengths;
   one or more two-mode Bragg gratings (TBGs); and
   one or more mode multiplexers each configured to:
      transmit, to a respective TBG of the one or more TBGs, a fundamental mode of a respective first wavelength of the plurality of wavelengths, wherein the respective TBG is configured to (i) transmit the fundamental mode of the respective first wavelength and (ii) reflect a respective second wavelength of the plurality of wavelengths;
      receive the respective second wavelength reflected from the respective TBG;
      convert a mode of the respective second wavelength to a fundamental mode; and
      output the fundamental mode of the respective second wavelength.

2. The optical apparatus of claim 1, wherein each of the one or more mode multiplexers is configured to output the fundamental mode of the respective second wavelength to a respective output port of the plurality of output ports.

3. The optical apparatus of claim 1, wherein each of the one or more TBGs comprises a silicon nitride or a silicon oxynitride material.

4. The optical apparatus of claim 1, wherein each of the one or more TBGs is configured to reflect a first-order mode or a second-order mode of the respective second wavelength.

5. The optical apparatus of claim 1,
   wherein the one or more TBGs comprise a plurality of TBGs in a cascaded arrangement, and
   wherein the one or more mode multiplexers comprise a plurality of mode multiplexers.

6. The optical apparatus of claim 5, wherein a last TBG of the cascaded arrangement is configured to:
   reflect a second-to-last wavelength of the plurality of wavelengths toward a first output port of the plurality of output ports; and
   transmit a last wavelength of the plurality of wavelengths to a second output port of the plurality of output ports.

7. The optical apparatus of claim 5, wherein a last grating of the cascaded arrangement is configured to:
   reflect a last wavelength of the plurality of wavelengths to a first output port of the plurality of output ports.

8. The optical apparatus of claim 1, further comprising:
   one or more other TBGs each configured to:
      receive, from a respective mode multiplexer of the one or more mode multiplexers, the fundamental mode of the respective second wavelength; and
      reflect the respective second wavelength toward a respective output port of the plurality of output ports.

9. The optical apparatus of claim 8, further comprising:
one or more optical absorbers, wherein each of the one or more other TBGs has an output coupled with a respective optical absorber of the one or more optical absorbers.

10. The optical apparatus of claim 1, wherein the one or more TBGs comprise a plurality of TBGs having non-overlapping passbands.

11. The optical apparatus of claim 1, wherein the one or more TBGs comprise a plurality of TBGs having partially overlapping passbands.

12. The optical apparatus of claim 11, wherein each passband of the partially overlapping passbands has a center wavelength and an upper roll-off wavelength that are selected such that a range of the respective second wavelength reflected by the respective TBG of the plurality of TBGs is entirely included between the center wavelength and the upper roll-off wavelength.

13. The optical apparatus of claim 1, wherein the one or more TBGs operate as low-pass filters.

14. An optical apparatus comprising:
a plurality of receivers; and
a demultiplexer comprising:
an input port configured to receive an optical signal comprising a plurality of wavelengths;
a plurality of output ports each configured to output a respective wavelength of the plurality of wavelengths to a respective receiver of the plurality of receivers;
one or more two-mode Bragg gratings (TBGs); and
one or more mode multiplexers each configured to:
transmit, to a respective TBG of the one or more TBGs, a fundamental mode of a respective first wavelength of the plurality of wavelengths, wherein the respective TBG is configured to (i) transmit the fundamental mode of the respective first wavelength and (ii) reflect a respective second wavelength of the plurality of wavelengths;
receive the respective second wavelength reflected from the respective TBG;
convert a mode of the respective second wavelength to a fundamental mode; and
output the fundamental mode of the respective second wavelength.

15. The optical apparatus of claim 14, wherein the demultiplexer operates as a coarse wavelength division multiplexing (CWDM) demultiplexer.

16. The optical apparatus of claim 14, wherein the plurality of receivers and the demultiplexer are implemented in a photonic chip.

* * * * *